United States Patent
Smith

(10) Patent No.: US 10,527,296 B2
(45) Date of Patent: Jan. 7, 2020

(54) TEMPERATURE DELTA CONTROL FOR A HYDRONIC HEATING/COOLING SYSTEM

(71) Applicant: Computime, Ltd., Queensway (HK)

(72) Inventor: Philip John Smith, Guangdong (CN)

(73) Assignee: Computime Ltd., New Territories (HK)

( * ) Notice: Subject to any disclaimer, the term of this patent is extended or adjusted under 35 U.S.C. 154(b) by 77 days.

(21) Appl. No.: 15/962,437

(22) Filed: Apr. 25, 2018

(65) Prior Publication Data
US 2019/0331349 A1   Oct. 31, 2019

(51) Int. Cl.
| | |
|---|---|
| *F24F 11/83* | (2018.01) |
| *F24D 19/10* | (2006.01) |
| *F24D 3/04* | (2006.01) |
| *G05B 19/042* | (2006.01) |
| *F24F 3/06* | (2006.01) |

(52) U.S. Cl.
CPC .......... *F24D 19/1018* (2013.01); *F24D 3/04* (2013.01); *F24F 3/06* (2013.01); *F24F 11/83* (2018.01); *G05B 19/042* (2013.01); *G05B 2219/2614* (2013.01)

(58) Field of Classification Search
None
See application file for complete search history.

(56) References Cited

U.S. PATENT DOCUMENTS

| | | | | |
|---|---|---|---|---|
| 2004/0042772 A1* | 3/2004 | Whitford | .............. | F24H 9/2021 392/498 |
| 2011/0083621 A1* | 4/2011 | Ogunleye | ............... | F01N 3/208 123/41.02 |
| 2011/0195652 A1* | 8/2011 | Smith | ................ | H05K 7/20836 454/184 |
| 2011/0302947 A1* | 12/2011 | Honda | ...................... | F24D 3/02 62/324.6 |

(Continued)

FOREIGN PATENT DOCUMENTS

| | | |
|---|---|---|
| DE | 202014103760 U1 | 8/2015 |
| EP | 2636959 A1 | 9/2013 |

(Continued)

OTHER PUBLICATIONS

Sep. 9, 2019—(Eu) European Search Report—Appl No. 19171229.8.

*Primary Examiner* — Bernard G Lindsay
(74) *Attorney, Agent, or Firm* — Banner & Witcoff, Ltd.

(57) ABSTRACT

A controller assembly controls water flow through individual emitters of a heating/cooling system based on a temperature setpoint and room temperature indicator obtained from an associated thermostat. The controller assembly provides delta temperature room control using a high precision movement actuator fitted with two pipe temperature sensors to power modulate individual radiators, underfloor heating circuits or fan-coils to provide energy efficiency for individual room heating/cooling control. Based on the temperature difference between the room (Continued)

temperature and the setpoint the controller assembly controls water flow through the emitter by adjusting a valve to attain a target temperature delta between the inlet and outlet of the emitter. As the room temperature approaches the setpoint so that the temperature difference decreases, the power output of the emitter is modulated to achieve desirable performance characteristics.

14 Claims, 9 Drawing Sheets

(56) References Cited

U.S. PATENT DOCUMENTS

| | | | | |
|---|---|---|---|---|
| 2012/0266620 | A1* | 10/2012 | Bernardi | F25B 49/005 62/126 |
| 2012/0291468 | A1* | 11/2012 | Kato | F24F 3/06 62/185 |
| 2013/0240172 | A1* | 9/2013 | Reilly | G05D 23/1931 165/11.1 |
| 2015/0168000 | A1* | 6/2015 | Dempster | F24F 3/08 165/299 |
| 2016/0123638 | A1* | 5/2016 | Kimura | F24F 11/89 62/189 |
| 2017/0219219 | A1* | 8/2017 | Miller | F24D 19/1012 |
| 2018/0031251 | A1* | 2/2018 | Smith | F24D 3/02 |

FOREIGN PATENT DOCUMENTS

| | | | |
|---|---|---|---|
| EP | 3034955 | A1 | 6/2016 |
| EP | 3276267 | A1 | 1/2018 |

* cited by examiner

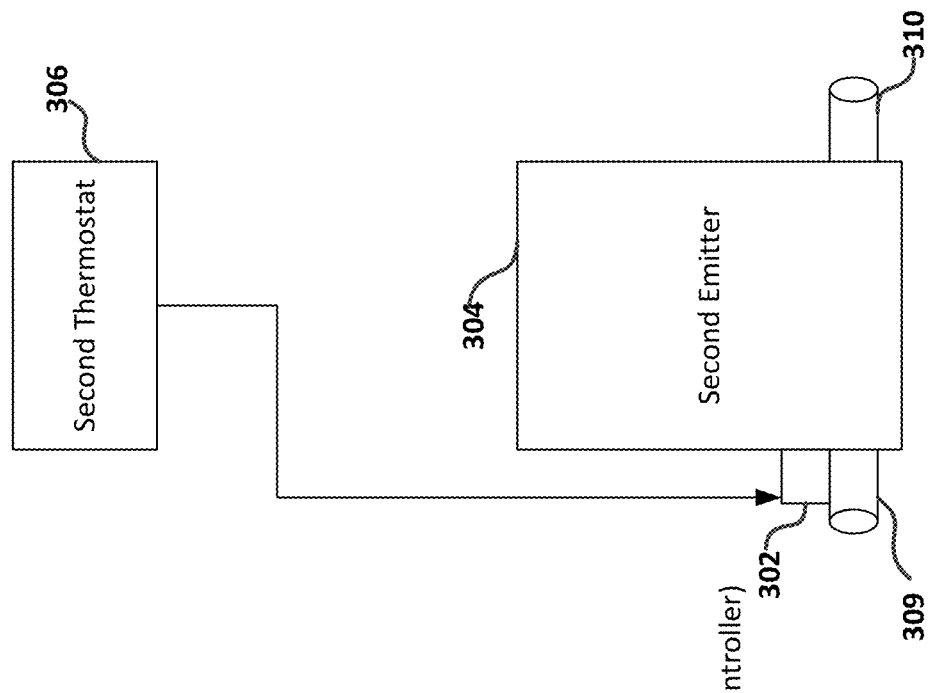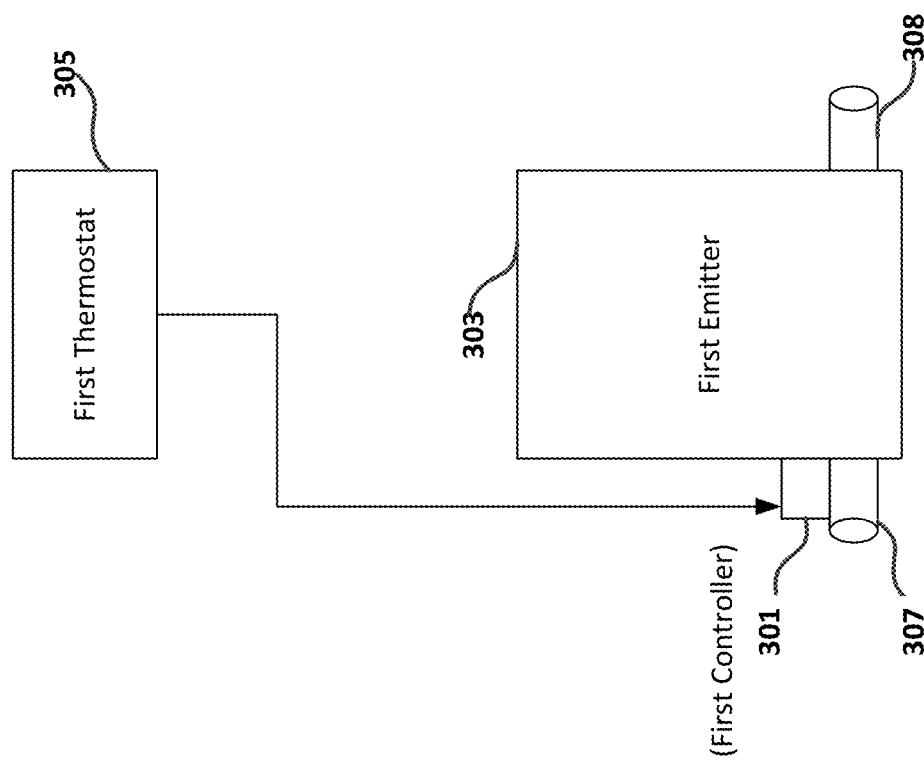
Figure 3

TEMPERATURE DELTA CONTROL FOR A HYDRONIC HEATING/COOLING SYSTEM

TECHNICAL FIELD

Aspects of the disclosure relate to power modulating individual radiators, underfloor heating circuits, chilled beams or fan-coils for a heating/cooling system.

BACKGROUND OF THE INVENTION

Heating/cooling systems with hydronic emitters (including radiators, underfloor heating/cooling circuits, fan coils, chilled beams) are based on power transfer from one or more of the hydronic emitters to affect one or more environmental entities (for example, offices, apartments, conference rooms, and the like). Traditional approaches often switch on the heating when the temperature of the environmental entity falls below the setpoint and switch off the heating when the temperature rises above the setpoint. This approach typically exhibits various deficiencies. For example, the resulting temperature control is quite poor and may produce both temperature overshoot and undershoot of the desired temperature.

SUMMARY OF THE INVENTION

An aspect provides delta temperature room control using a high precision movement actuator fitted with two pipe temperature sensors to power modulate individual radiators, underfloor heating circuits, chilled beams or fan-coils to provide energy efficiency for individual room heating/cooling control.

An aspect provides a manifold or valve heating/cooling system having a controller assembly controlling the manifold/valve system. The controller assembly includes a movement actuator configured to connect to a valve in order to control water flow through a hydronic emitter and a temperature sensor interface configured to interface to first and second temperature sensors that measure an inlet temperature and an outlet temperature, respectively, of the hydronic emitter, where a measured temperature delta is a difference between the inlet and outlet temperatures. A thermostat interface obtains a temperature setpoint and a room temperature for an environmental entity such as a room. The controller assembly obtains a target temperature delta from the difference of the temperature setpoint and room temperature and subsequently controls the movement actuator to adjust a valve resulting in water flow through the hydronic emitter based on the target temperature delta. The controller assembly may repeat the above actions for an updated room temperature.

With another aspect, a controller assembly incrementally controls the movement actuator to adjust the valve so that water flow through the hydronic emitter corresponds to an incremental change of the measured temperature delta, waits for the measured temperature delta to stabilize, and repeats the above actions until the measured temperature delta approximately equals the target temperature delta.

With another aspect, a controller assembly generates a data structure that maps a resulting position of the valve to a temperature difference between the temperature setpoint and room temperature when the measured temperature delta approximately equals the target temperature delta.

With another aspect, when a mapping of a valve position and a temperature difference between the temperature setpoint and room temperature is stored a data structure, a controller assembly instructs the movement actuator to directly adjust the valve to the resulting position. When the mapping is not stored in the data structure, the controller assembly incrementally controls the movement actuator to adjust the valve so that water flow through the hydronic emitter corresponds to an incremental change of the measured temperature delta. The controller assembly then waits for the measured temperature delta to stabilize and repeats the above actions until the measured temperature delta approximately equals the target temperature delta.

With another aspect, a manifold heating/cooling system includes first and second controller assemblies that control first and second emitters, respectively. This aspect enables the system to control multiple heating/cooling zones.

BRIEF DESCRIPTION OF THE DRAWINGS

The foregoing summary of the invention, as well as the following detailed description of exemplary embodiments of the invention, is better understood when read in conjunction with the accompanying drawings, which are included by way of example, and not by way of limitation with regard to the claimed invention.

FIG. 3 shows an under-floor heating/cooling manifold with a plurality of emitters in accordance with an embodiment.

DETAILED DESCRIPTION

According to an aspect of the embodiments, a heating/cooling system supports individual room load compensation for use with both modulated and non-modulated boilers. The control uses a precision movement actuator connected to a valve or manifold. Two remote pipe temperature sensors are attached to the actuator, where one is attached to the emitter flow pipe and the other is attached to the emitter return pipe.

The control "modulates" the heating/cooling emitter by varying flow rate through the emitter dependent upon the temperature delta across the emitter flow and return temperature such that the power given off by the emitter is modulated. The power level required by a control device (for example, thermostat) from the emitter is controlled by the difference from the room temperature to the setpoint. For example, in the case of a hot water radiator when the room temperature is greater than 1.5 C degrees from the setpoint, the actuator will be opened to full flow (100% power output) by reducing the temperature delta between the emitter flow and return.

As the room temperature approaches the setpoint, the actuator may adjust the flow rate by increasing the temperature delta between the emitter flow and return. This adjustment causes the emitter power output to be reduced. With some embodiments, the power output can be modulated between 1% and 100%. As the room temperature reaches the setpoint, the actuator may restrict the flow to match the room energy losses. Only when the room temperature exceeds the setpoint by, for example, 0.2 C degrees will the actuator close the water flow completely.

This control approach may ensure that there is no overshoot or undershoot of the room temperature and also ensure that the delta temperature control will achieve this without continually switching the boiler/pump on and/or off. Because the temperature delta control (TDC) approach is implemented at the emitter rather than at the system boiler, individual room modulation control can be achieved using a standard boiler.

The delta temperature control approach has various advantages with respect to traditional approaches. With under floor heating (UFH), the actuator may be assembled to the heating manifold and controlled from the room thermostat via a wiring center. For radiators the actuator may be assembled to the radiator with either wired pipe sensors or wireless remote pipe sensors. Room control may be obtained from the room thermostat either via wired or wireless channels. For fan coil control the actuator may be assembled to the flow/return pipe in the fan coil with wired pipe sensors, where control may be from the fan coil thermostat via either wired or wireless channels.

Figure 1:
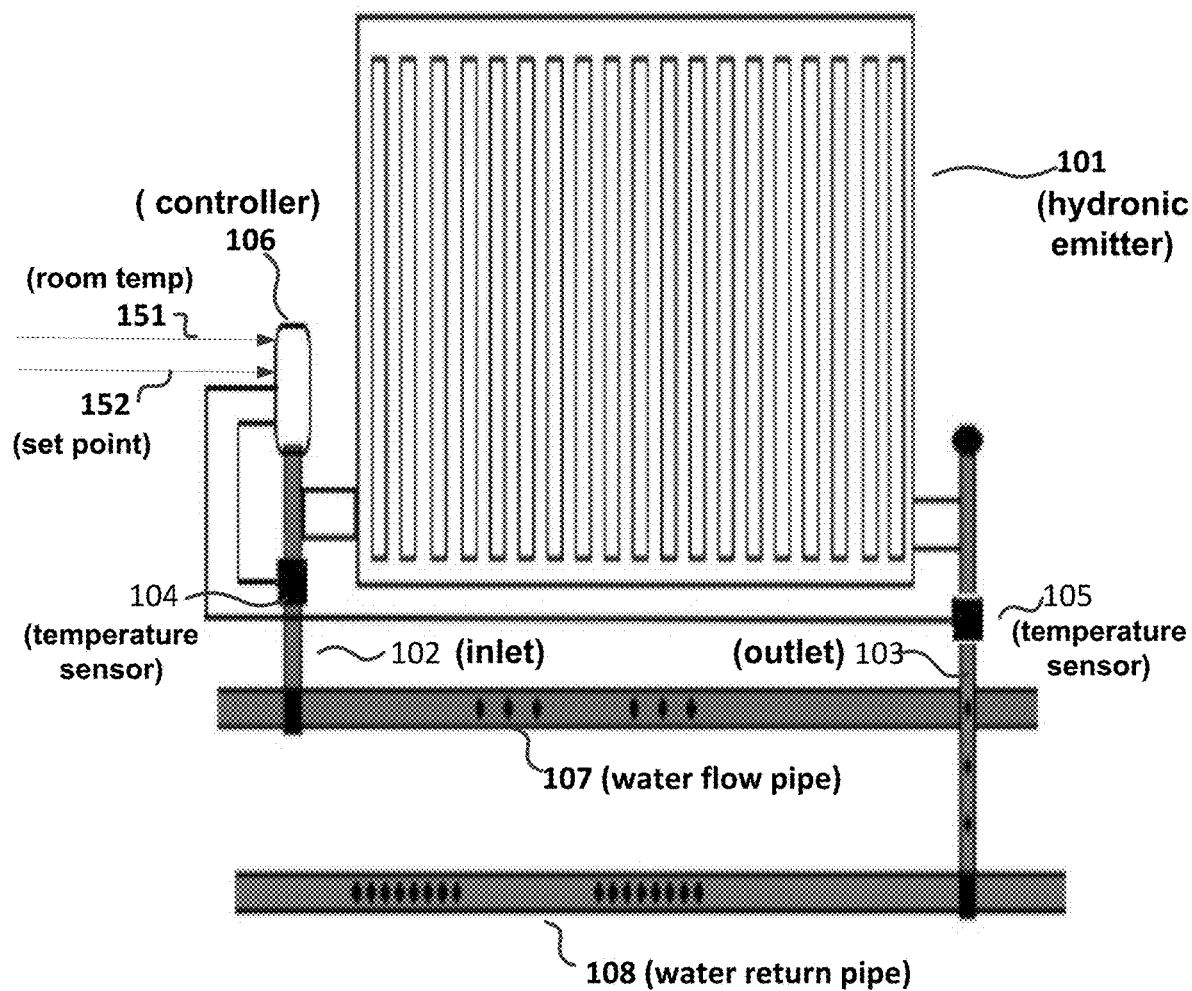
FIG. 1 shows a radiator in accordance with an embodiment.

FIG. 1 shows a radiator in accordance with an embodiment. As will be further discussed, controller assembly 106 controls water flow through hydronic emitter (radiator) 101 via a valve not explicitly shown to achieve a desired temperature delta between inlet 102 and outlet 103.

Controller assembly 106 may support heating and/or cooling environmental systems. When supporting a heating mode, water flow pipe 107 transports heated water to hydronic emitter 101 through inlet 102. When supporting a cooling mode, water flow 107 transports cooled water. Water return pipe 108 returns the expended water from hydronic emitter 101 through outlet 103.

Controller assembly 106 measures the inlet and outlet temperatures through temperature sensors 104 and 105, respectively, and adjusts the water flow through hydronic emitter 101 so that the measured temperature delta approximately equals the target temperature delta, where the temperature delta equals the temperature difference between the outlet temperature and the inlet temperature. For example, when controller assembly 106 is operating in the heating mode and receives a temperature setpoint and a room temperature indication from an associated thermostat, controller assembly 106 adjusts the water flow though hydronic emitter 101 so that the hydronic emitter 101 provides an appropriate power output to a corresponding environmental entity (for example, a room). When the measured temperature delta approximately equals the target temperature delta, controller assembly 106 repeats the above actions based on the updated room temperature obtained from the associated thermostat, where the updated temperature difference is the difference between the updated room temperature and the temperature setpoint. Consequently, controller assembly 106 modulates the water flow through hydronic emitter 101 (by varying the valve position of hydronic emitter 101) as the room temperature approaches the temperature setpoint.

Controller assembly 106 may connect to temperature sensors 104 and 105 in a number of ways. For example, temperature sensors 104 and 105 may be separate radio frequency module sensors that report the measured temperatures to controller assembly 106 periodically or by a wired communication.

While FIG. 1 shows controller assembly 106 attached near inlet 102, some embodiments may support controller assembly 106 being attached near outlet 103, where a valve controls water flow through outlet 103.

Figure 2:
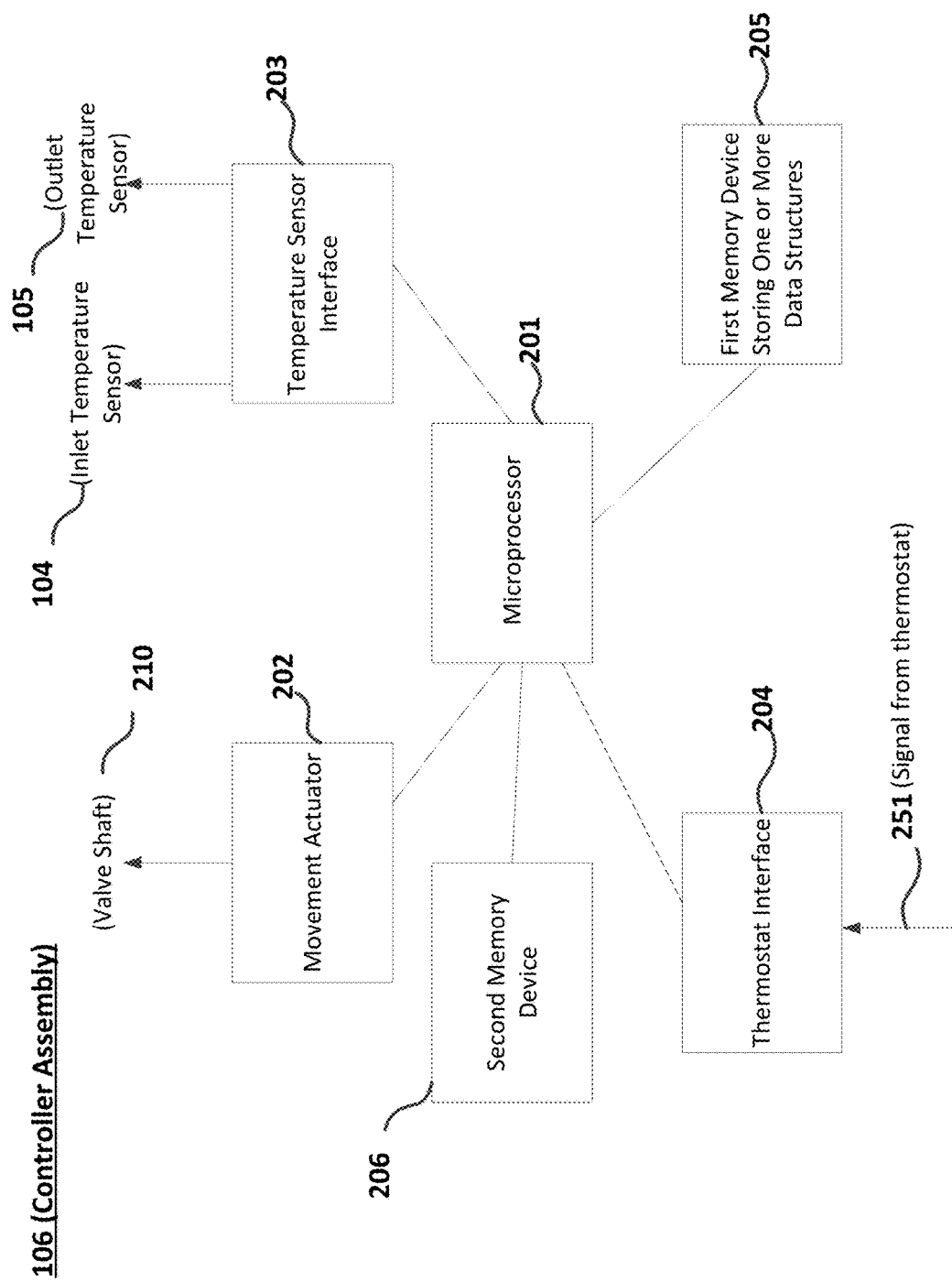
FIG. 2 shows a controller assembly that controls water flow through a hydronic emitter in accordance with an embodiment.

FIG. 2 shows controller assembly 106 that controls water flow through a hydronic emitter in accordance with an embodiment.

Controller assembly 106 obtains thermostat signal 251, which may be indicative of the temperature setpoint and current room temperature, via thermostat interface 204. Controller assembly 106 may receive signal 251 through various communication media, including wireless or wired channels using different communication protocols.

Processor 201 processes signal 251 in accordance with computer readable instructions obtained from memory device 206. For example, the computer readable instructions may reflect flowchart 400 and/or flowchart 900 shown in FIGS. 4 and 9, respectively, as will be discussed. Based on information obtained from signal 251, processor 201 controls water flow though hydronic emitter 101 by controlling a valve through movement actuator 202. For example, movement actuator 202 may comprises a precision motor drive that drives valve shaft 210 as instructed by processor 201.

Processor 201 also obtains measured temperatures measured at inlet 102 and outlet 103 via temperature sensor interface 203 from temperature sensors 104 and 105, respectively. The difference between inlet 102 and outlet 103 may referred as the measured temperature delta.

Figure 7:
FIG. 7 shows a mapping between a temperature difference and a target temperature delta for an emitter in accordance with an embodiment.

With some embodiments, processor 201 determines a temperature difference between the room temperature and temperature setpoint obtained from signal 251. Processor 201 then accesses a data structure stored in memory device 205 that maps the temperature difference to a target temperature delta. An exemplary mapping is depicted as data structure 700 as shown in FIG. 7. For example, when the temperature difference equals diff_1 701, the target temperature delta equals target_temp_delta_1 704. Processor 201 then drives valve shaft 210 so that the measured temperature delta approximately equals the target_temp_delta_1 704. Several approaches for achieving this objective will be presented when discussing FIGS. 4 and 9.

After the measured temperature delta reaches target_temp_delta_1 704, processor 201 obtains the updated room temperature from the associated thermostat and consequently the updated temperature difference. For example, referring to FIG. 7, when the updated temperature equals diff_2 702, the target temperature delta equals target_temp_delta 705. Processor 201 then drives valve shaft 210 so that the measured temperature delta approximately equals the target temp delta_1 705.

With reference to FIG. 2, the computing system environment may include a computing device wherein the processes (for example, shown in FIGS. 4 and 9) discussed herein may be implemented. The computing device may have a processor 201 for controlling overall operation of the computing device and its associated components, including RAM, ROM, communications module, and memory devices 205 and 206. The computing device typically includes a variety of computer readable media. Computer readable media may be any available media that may be accessed by computing device and include both volatile and nonvolatile media, removable and non-removable media. By way of example, and not limitation, computer readable media may comprise a combination of computer storage media and communication media.

Computer storage media may include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computing device.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

With some embodiments, memory devices 205 and 206 may be physically implemented with a single memory device.

Traditional approaches often have only a single thermostat and consequently do not support multiple thermostats. With traditional approaches, a boiler provides a single water temperature applicable to the entire building structure.

With an aspect of the embodiments, water flow is controlled separately for different hydronic emitters associated with different portions (for example, rooms) of the building structure (for example, a house) rather than at the boiler itself. Consequently, embodiments may support multiple heating/cooling zones.

FIG. 3 shows an under-floor heating/cooling manifold with a plurality of emitters 303 and 304 in accordance with an embodiment. Controller assemblies 301 and 302 control water flow through emitters 303 and 304, respectively, based on signals obtained from thermostats 305 and 306, respectively. Inlets 307 and 309 may connect to water flow pipe 107 and outlets 308 and 310 may connect to water return pipe 108 as shown in FIG. 1.

Controller assemblies 301 and 302 control water flow through emitters 303 and 304, respectively, based on measured temperature deltas measured between inlet 307 and outlet 308 and between inlet 309 and outlet 310, respectively. Consequently, controller assemblies 301 and 302 may support separate first and second heating/cooling zones, respectively. In accordance with some embodiments, while not explicitly shown, controller assembly 301 is electrically coupled to temperature sensors thermally coupled to inlet 307 and outlet 308 while controller assembly 302 is electrically coupled to temperature sensors thermally coupled to inlet 309 and outlet 310.

Figure 4:
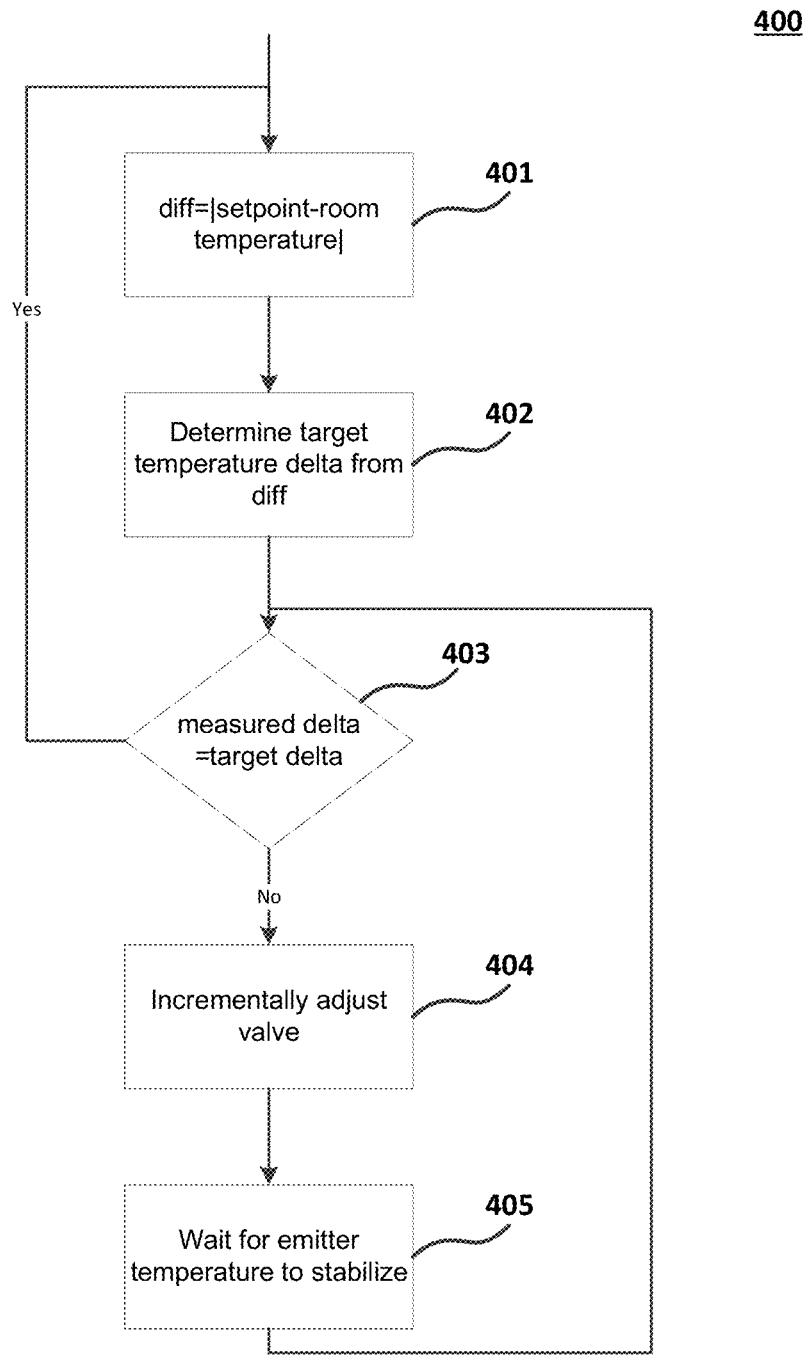
FIG. 4 shows a flowchart of the operation of a controller assembly in accordance with an embodiment.

FIG. 4 shows flowchart 400 of the operation of controller assembly 106 in accordance with an embodiment. At block 401 processor 201 initiates process 400 by obtaining the room temperature and setpoint from the associated thermostat and consequently determines the temperature difference. Processor 201 then accesses data structure 700 to obtain the target temperature delta at block 402.

At blocks 403-405, processor 201 incrementally adjusts a valve controlling water flow at inlet 102 so that the measured temperature delta incrementally approaches (converges to) the target temperature delta. When the measured temperature delta approximately equals the target temperature delta, processor 201 obtains the updated room temperature from the associated thermostat at block 401. Blocks 401-405 are repeated until the room temperature reaches a desired temperature (for example, the temperature setpoint or predetermined temperature offset from the setpoint).

Figure 5:
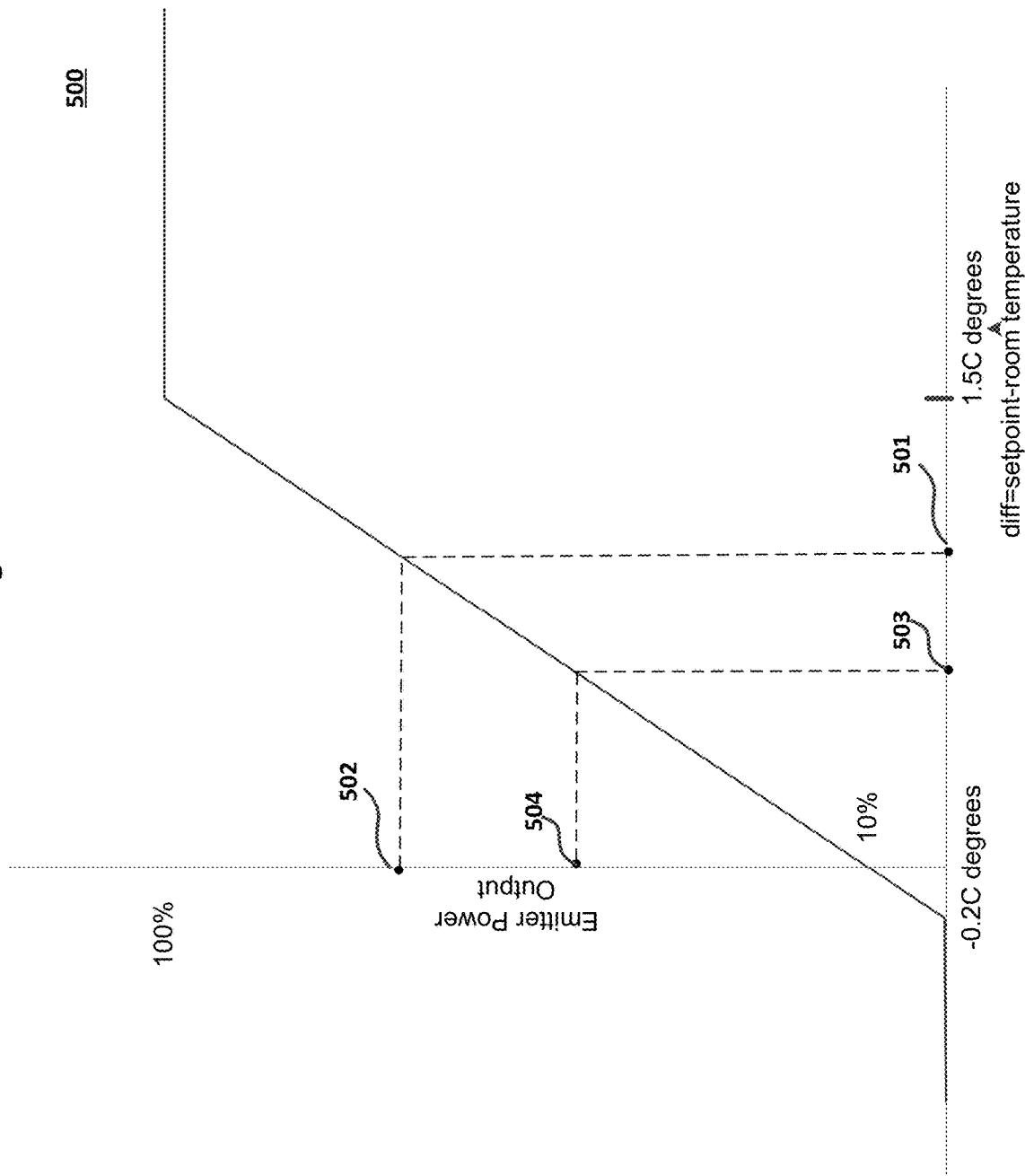
FIG. 5 shows an exemplary relationship between an emitter power output and a temperature difference in accordance with an embodiment.

FIG. 5 shows exemplary relationship 500 between an emitter power output and a temperature difference in accordance with an embodiment. The emitter power output is at the maximum capability (100%) when the temperature difference is at or above a first predetermined value (shown as 1.5 C degrees in exemplary relationship 500).

As the temperature difference varies from the first predetermined value to a second predetermined value (shown as 0 C degrees in exemplary relationship 500), the emitter power output varies from 100% to 1%. When the temperature difference reaches a third predetermined value, the water flow is stopped so that the power output equals 0%.

Figure 6:
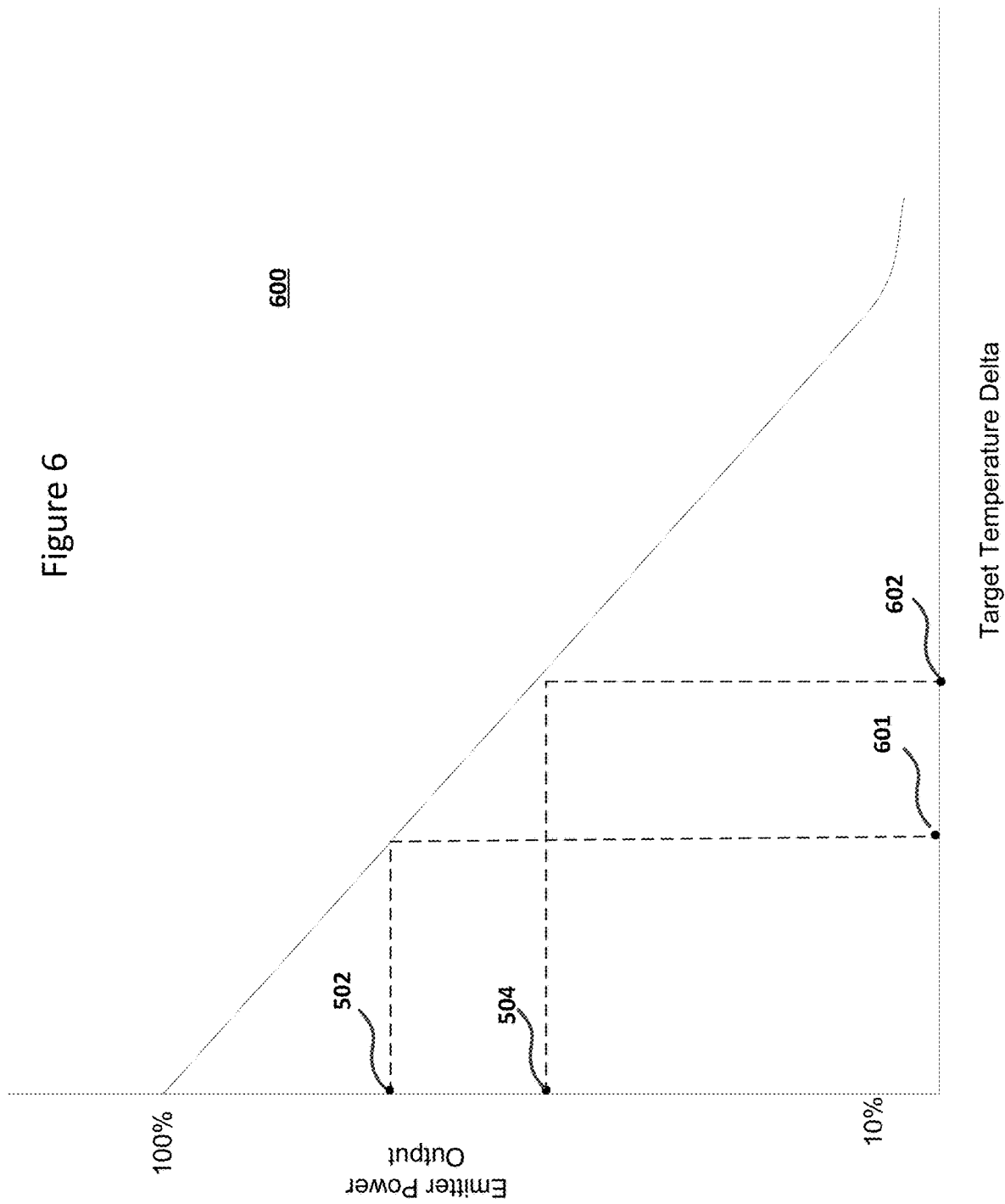
FIG. 6 shows an exemplary relationship between an emitter power output and a measured temperature delta of the emitter in accordance with an embodiment.

FIG. 6 shows exemplary relationship 600 between an emitter power output and a measured temperature delta of the emitter in accordance with an embodiment.

From relationships 500 and 600, a resulting relationship between the temperature difference and a corresponding target temperature delta may be obtained as reflected in the mapping shown in FIG. 7. For example, referring to FIG. 5, temperature difference 501 corresponds to power output 502. From relationship 600 shown in FIG. 6, power output 501 corresponds to target temperature delta 601. Consequently, temperature difference 501 maps to target temperature delta 601 as reflected in data structure 700. Similarly, temperature difference 503 corresponds to power output 504 which corresponds to target temperature delta 602.

Figure 8:
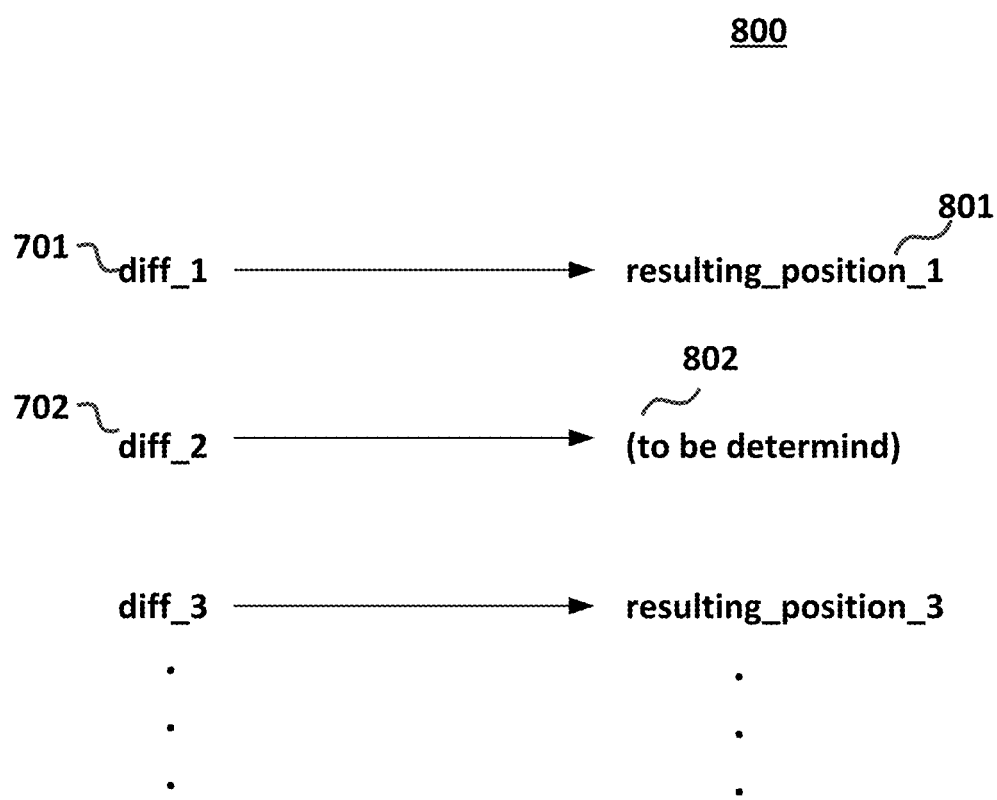
FIG. 8 shows a mapping between a temperature difference and a resulting position of a valve controlling water flow through an emitter in accordance with an embodiment.

FIG. 8 shows mapping 800 between a temperature difference and a resulting position of a valve controlling water flow through emitter 101 in accordance with an embodiment. Referring to FIG. 7, mapping 700 presents the target temperature delta for an emitter but does not explicitly present the corresponding valve position. Consequently, controller assembly 106 when executing computer readable instructions corresponding to flowchart 400 incrementally adjusts the valve until the measured temperature delta approximately equals the target temperature delta. When reaching the target temperature delta, processor 201 can determine the resulting position of the valve. Corresponding entries in mapping 800 may be generated for the particular temperature difference. For example, resulting_position_1 801 is mapped to diff_1 701 while there is no mapping for diff_2 702 (where value 802 is "to be determined") because, with the hypothetical example, processor 201 has not encountered corresponding diff_2 702. As will be discussed, processor 201 may utilize the generated entries in mapping 800 to expedite control by controller assembly 106. The above approach may be advantageous to generating a fixed mapping for mapping 800 when characteristics of the emitter and variability of the associated valve sufficiently differ from one configuration to another.

Figure 9:
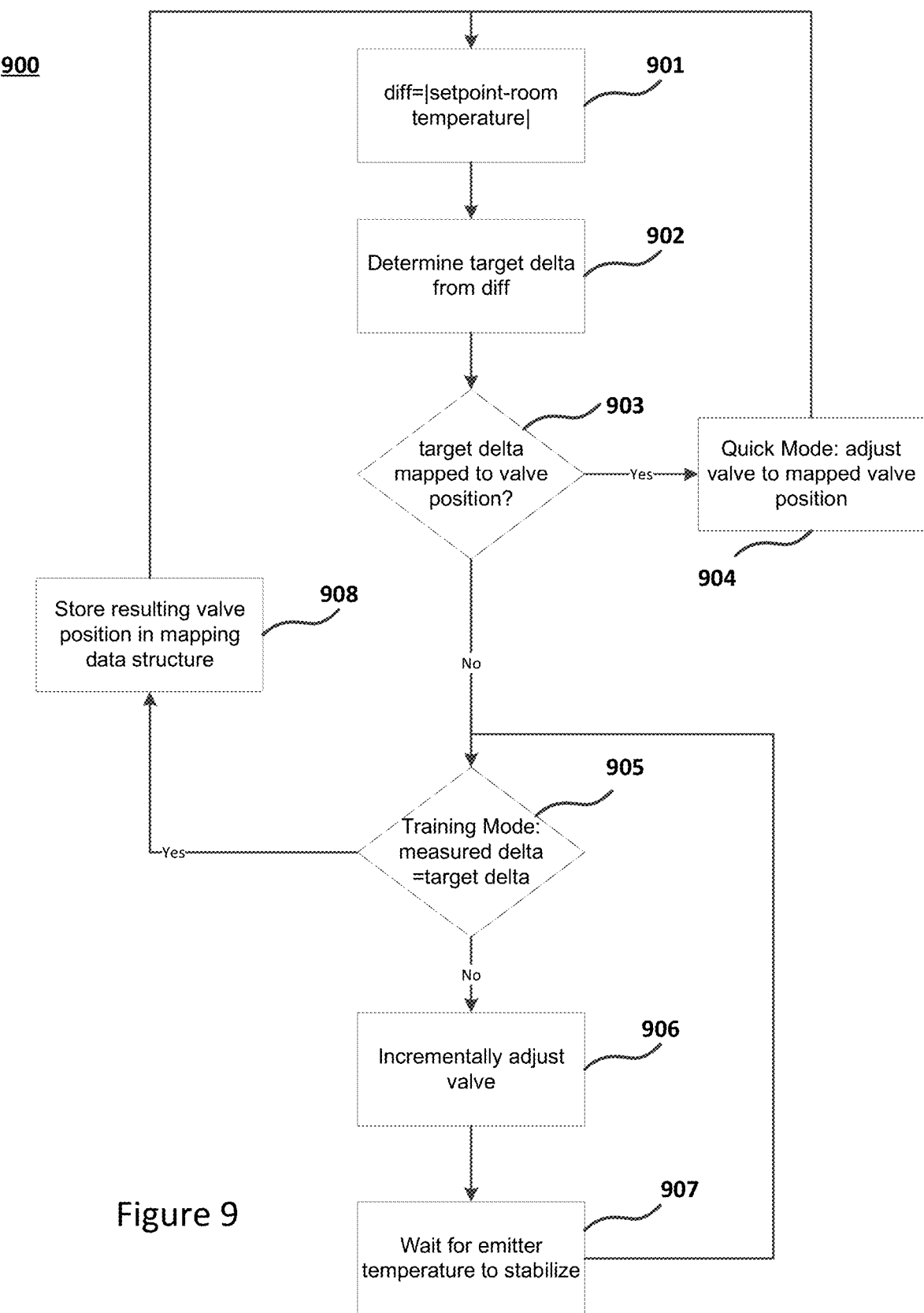
FIG. 9 shows a flowchart of the operation of a controller assembly in accordance with an embodiment.

FIG. 9 shows process 900 of the operation of controller assembly 106 in accordance with an embodiment. Operation at blocks 901-902 and 905-907 is similar to that at blocks 401-402 and 403-405, respectively, as previously discussed with FIG. 4. However, when an entry has been generated in mapping 800 for a given temperature difference, process 900 adjusts the valve position in one step at block 904 without incrementally adjusting the valve and is consequently referred as the "quick mode."

However, if an entry has not been generated in mapping for a given temperature difference, processor 201 executes blocks 905-907 in a similar fashion as with blocks 403-405 of process 400. In addition, when the measured temperature delta approximately equals the target temperature delta, processor 201 can generate an entry for the temperature difference at block 908 by tracking the valve position at that event. Because process 900 is able to generate mapping 900, blocks 905-907 may be referred to as a "training mode."

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

What is claimed is:

1. A heating and/or cooling system comprising:
    at least one controller assembly controlling the system, the at least one controller assembly including:
        a movement actuator configured to connect to a valve in order to control water flow through a hydronic emitter;
        a temperature sensor interface configured to interface to first and second temperature sensors, wherein the first temperature sensor and the second temperature sensor measure an inlet temperature and an outlet temperature, respectively, of the hydronic emitter and wherein a measured temperature delta is a difference between the inlet and outlet temperatures;
        a thermostat interface configured to obtain a temperature setpoint and a room temperature for an environmental entity; and
        a computer device comprising:
        a processor;
        a first memory device; and
        a second memory device storing computer-readable instructions that, when executed by the processor, cause the at least one controller assembly to perform:
        obtaining, through the thermostat interface, the temperature setpoint and the room temperature;
        accessing a target temperature delta from a first data structure stored on the first memory device, wherein the first data structure maps the target temperature delta based on the temperature setpoint and the room temperature and wherein the first data structure maps the target temperature delta to a temperature difference between the temperature setpoint and the room temperature;
        mapping, in a second data structure stored in the first memory device, a resulting position of the valve to the temperature difference when the measured temperature delta equals the target temperature delta;
        when a mapping for the temperature difference is stored in the second data structure, instructing the movement actuator to directly adjust the valve to the resulting position;
        when the mapping for the temperature difference is not stored in the second data structure,
        incrementally controlling the movement actuator to adjust the valve so that water flow through the hydronic emitter corresponds to an incremental change of the measured temperature delta;
        waiting for the measured temperature delta to satisfy a stability condition; and
        repeating the incrementally controlling and the waiting until the measured temperature delta equals the target temperature delta;
        controlling the movement actuator to adjust the valve so that water flow through the hydronic emitter results in the measured temperature delta equaling the target temperature delta; and
        repeating the obtaining, the accessing, and the controlling for an updated room temperature.

2. The heating and/or cooling system of claim 1 further comprising a first and a second controller assembly, wherein:
    the first controller assembly controls water flow through a first emitter and comprises a first processor and a third memory device storing computer-readable instructions that, when executed by the first processor, cause the first controller assembly to perform:
        accessing a first target temperature delta for the first emitter from first data provided by a first thermostat; and
    wherein:
    the second controller assembly controls water flow through a second emitter and comprises a second processor and a fourth memory device storing computer-readable instructions that, when executed by the second processor, cause the second controller assembly to perform:
        accessing a second target temperature delta for the second emitter from second data provided by a second thermostat.

3. A method for controlling a fluid flowing through a first emitter of a heating and/or cooling system, the method comprising:
    obtaining, through a thermostat interface, a first temperature setpoint and a first room temperature for a first environmental entity;
    accessing a first target temperature delta based on a temperature difference between the first temperature setpoint and the first room temperature;
    measuring a first measured temperature delta between a first inlet and a first outlet of a first emitter, wherein the first measured temperature delta is a difference between the first inlet and outlet temperatures;
    mapping a resulting position of a first valve to the temperature difference when the first measured temperature delta equals the first target temperature delta;
    when a mapping for the temperature difference and the resulting position is stored in a data structure, instructing a first movement actuator to directly adjust the first valve to the resulting position;
    when the mapping for the temperature difference and the resulting position is not stored in the data structure,
    incrementally controlling the first movement actuator to adjust the first valve so that fluid flow through the first emitter corresponds to an incremental change of the first measured temperature delta;
    waiting for the first measured temperature delta to satisfy a stability condition; and
    repeating the incrementally controlling and the waiting until the first measured temperature delta equals the first target temperature delta;

adjusting, through a first movement actuator, the first valve so that fluid flow through the first emitter results in the first measured temperature delta equaling the first target temperature delta; and repeating the obtaining, the accessing, the measuring, and the adjusting for an updated first room temperature.

4. The method of claim 3 further comprising:

obtaining, through the thermostat interface, a second temperature setpoint and a second room temperature for a second environmental entity;

accessing a second target temperature delta based on the second temperature setpoint and the second room temperature;

measuring a second measured temperature delta between a second inlet and a second outlet of a second emitter, wherein the second measured temperature delta is a difference between the second inlet and outlet temperatures; and adjusting, through a second movement actuator, a second valve so that fluid flow through the second emitter corresponds to the second measured temperature delta equaling the second target temperature delta.

5. The method of claim 3, wherein the fluid comprises water.

6. The method of claim 3 further comprising:

when a difference between the first temperature setpoint and the first room temperature is greater than a first predetermined amount, setting the first target temperature delta so that the first valve is fully open to obtain a maximum power level from the first emitter.

7. The method of claim 6 further comprising, further comprising:

when the difference between the first temperature setpoint and the first room temperature is less than the first predetermined amount and greater than a second predetermined amount, setting the first target temperature delta so that the first valve is partially open to obtain a partial power level from the first emitter.

8. The method of claim 7 further comprising:

when the difference between the first temperature setpoint and the first room temperature is less than a third predetermined amount, fully closing the first valve so that fluid flow is stopped.

9. The method of claim 8, wherein the third predetermined amount corresponds to the first room temperature exceeding the first temperature setpoint by 0.2 degrees C.

10. The method of claim 5, wherein a heating source of the heating and/or cooling system is a boiler.

11. A non-transitory computer-readable medium storing computer-executable instructions that, when executed by a processor, cause an apparatus to perform:

obtaining a temperature setpoint and a room temperature for an environmental entity;

accessing a target temperature delta based on a temperature difference between the temperature setpoint and the room temperature;

measuring a measured temperature delta between an inlet and an outlet of a hydronic emitter, wherein the measured temperature delta is a difference between inlet and outlet temperatures;

mapping a resulting position of a valve to the temperature difference when the measured temperature delta equals the target temperature delta;

when a mapping for the temperature difference and the resulting position is stored in a data structure, instructing a movement actuator to directly adjust the valve to the resulting position;

when the mapping for the temperature difference and the resulting position is not stored in the data structure, incrementally controlling the movement actuator to adjust the valve so that fluid flow through an emitter corresponds to an incremental change of the measured temperature delta;

waiting for the measured temperature delta to satisfy a stability condition; and repeating the incrementally controlling and the waiting until the measured temperature delta equals the target temperature delta;

adjusting the valve so that water flow through the hydronic emitter corresponds to the measured temperature delta equaling the target temperature delta; and repeating the obtaining, the accessing, the measuring, and the adjusting for an updated room temperature.

12. The non-transitory computer-readable medium of claim 11 storing computer-executable instructions that, when executed by the processor, further cause the apparatus to perform:

when a difference between the temperature setpoint and the room temperature is greater than a predetermined amount, setting the target temperature delta so that the valve is fully open to obtain a maximum power level from the emitter.

13. The non-transitory computer-readable medium of claim 12 storing computer-executable instructions that, when executed by the processor, further cause the apparatus to perform:

when the difference between the temperature setpoint and the room temperature is less than a first predetermined amount and greater than a second predetermined amount, setting the target temperature delta so that the valve is partially open to obtain a partial power level from the emitter.

14. The non-transitory computer-readable medium of claim 13 storing computer-executable instructions that, when executed by the processor, further cause the apparatus to perform:

when the difference between the temperature setpoint and the room temperature is less than a third predetermined amount, fully closing the valve so that fluid flow is stopped.

* * * * *